US009500743B2

(12) United States Patent
Reid et al.

(10) Patent No.: US 9,500,743 B2
(45) Date of Patent: Nov. 22, 2016

(54) GOLF BALL LOCATOR (76) Inventors: Dion J. Reid, West Chester, OH (US);
Deron Reid, San Antonio, TX (US);
Bradley K. Hunt, San Antonio, TX (US)

(*) Notice: Subject to any disclaimer, the term of this patent is extended or adjusted under 35 U.S.C. 154(b) by 1184 days.

(21) Appl. No.: 13/017,676

(22) Filed: Jan. 31, 2011

(65) Prior Publication Data

US 2011/0207553 A1 Aug. 25, 2011

Related U.S. Application Data (60) Provisional application No. 61/299,960, filed on Jan. 30, 2010, provisional application No. 61/320,792, filed on Apr. 5, 2010.

(51) Int. Cl.
*G01S 7/41* (2006.01)
*A63B 24/00* (2006.01)
*A63B 37/00* (2006.01)
*G01S 13/88* (2006.01)
*G01S 19/19* (2010.01)
*A63B 43/00* (2006.01)
*G01S 13/75* (2006.01)

(52) U.S. Cl.
CPC ............ *G01S 7/412* (2013.01); *A63B 24/0021* (2013.01); *A63B 37/0003* (2013.01); *G01S 13/88* (2013.01); *G01S 19/19* (2013.01); *A63B 37/0022* (2013.01); *A63B 43/008* (2013.01); *A63B 2024/0053* (2013.01); *A63B 2220/12* (2013.01); *A63B 2220/89* (2013.01); *A63B 2225/54* (2013.01); *G01S 13/75* (2013.01)

(58) Field of Classification Search
USPC ....................................................... 473/353
See application file for complete search history.

(56) References Cited

U.S. PATENT DOCUMENTS

| 3,167,769 | A | * | 1/1965 | Boyer ............................... 342/5 |
| 4,660,039 | A | * | 4/1987 | Barricks et al. ................ 342/27 |
| 4,991,851 | A | | 2/1991 | Melesio |
| 5,150,895 | A | * | 9/1992 | Berger .......................... 473/467 |
| 5,370,387 | A | | 12/1994 | Baker et al. |
| 5,427,378 | A | | 6/1995 | Murphy |
| 5,662,533 | A | | 9/1997 | Chadwell |
| 5,662,534 | A | * | 9/1997 | Kroll et al. ................... 473/353 |
| 5,952,953 | A | | 9/1999 | Nikawa |
| 5,976,038 | A | * | 11/1999 | Orenstein et al. ............ 473/467 |
| 6,244,971 | B1 | * | 6/2001 | Mihran ........................ 473/200 |
| 6,482,108 | B1 | | 11/2002 | McLaughlin |

(Continued)

OTHER PUBLICATIONS

W. A. Imbriale, A New All-Metal Low-Pass Dichroic Plate, TDA Progress Report 42-129, May 15, 1997, Telecommunications Data Acquisition, NASA, Pasadena, CA.

*Primary Examiner* — Tramar Harper
(74) *Attorney, Agent, or Firm* — Patent Capital Group (57) ABSTRACT A system and method for locating lost golf balls is described. In one embodiment, a plurality of small RFID chips are applied to or embedded in a ball. When the ball is to be located, a user uses a ball finder to receive RF signals from the RFID chips and locate the ball. The ball finder may have useful additional features such as overlaid maps to help and GIS data to help the user find the ball. In an alternative embodiment, a ball is prepared by applying a highly-reflective paint, such as a metallic paint, or a highly-absorbent paint such as a black iron ball paint, to create a characteristic radar signature for the ball. The ball finder may then be configured to locate the ball using the characteristic radar signature.

16 Claims, 5 Drawing Sheets (56) References Cited

U.S. PATENT DOCUMENTS

| | | | |
|---|---|---|---|
| 6,908,404 B1* | 6/2005 | Gard | A63B 24/0021 473/353 |
| 2002/0091017 A1* | 7/2002 | Kuesters | A63B 24/0021 473/353 |
| 2002/0177490 A1* | 11/2002 | Yong | A63B 24/0021 473/353 |
| 2004/0142766 A1* | 7/2004 | Savarese et al. | 473/353 |
| 2005/0101411 A1* | 5/2005 | Stiller | A63B 24/0021 473/353 |
| 2006/0122007 A1* | 6/2006 | Savarese et al. | 473/351 |
| 2006/0128503 A1* | 6/2006 | Savarese et al. | 473/353 |
| 2007/0105637 A1* | 5/2007 | Shimizu | 473/151 |
| 2008/0021651 A1 | 1/2008 | Seeley et al. | |
| 2008/0207357 A1* | 8/2008 | Savarese et al. | 473/407 |
| 2010/0151955 A1* | 6/2010 | Holden | A63B 24/0021 473/199 |
| 2010/0184563 A1* | 7/2010 | Molyneux et al. | 482/1 |

* cited by examiner

GOLF BALL LOCATOR

CROSS REFERENCE TO RELATED APPLICATIONS

This application claims priority to U.S. Provisional Application 61/299,960, filed Jan. 30, 2011, and U.S. Provisional Application 61/320,792, filed Apr. 5, 2011, both of which are incorporated herein by reference. Unrelated U.S. Pat. No. 5,662,534 to Kroll, et al., entitled "Golf Ball Finding System;" and U.S. Pat. No. 5,952,953 to Nikawa, et al., entitled "Wave Absorber," are also incorporated by reference.

BACKGROUND

This specification relates to the field of sports and more particularly to a device and method for locating a golf ball.

Since the advent of golf in the 15th century, lost balls have been the nemesis of golfers. The present specification describes a novel device and method for preparing a golf ball and locating the prepared ball if it becomes lost during a round of golf.

SUMMARY OF THE INVENTION

In one aspect, a system and method for locating lost golf balls is described. In one embodiment, a plurality of small RFID chips are applied to or embedded in a ball. When the ball is to be located, a user uses a ball finder to receive RF signals from the RFID chips and locate the ball. The ball finder may have useful additional features such as overlaid maps to help and GIS data to help the user find the ball. In an alternative embodiment, a ball is prepared by applying a highly-reflective paint, such as a metallic paint, or a highly-absorbent paint such as a black iron ball paint, to create a characteristic radar signature for the ball. The ball finder may then be configured to locate the ball using the characteristic radar signature.

DETAILED DESCRIPTION OF THE EMBODIMENTS

A golf ball locator will now be described with more particular reference to the attached drawings. Hereafter, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance or example of an element and the un-hyphenated form of the reference numeral refers to the element generically or collectively. Thus, for example, 102-1 may refer to a "pen," which may be an instance or example of the class of "writing implements." Writing implements may be referred to collectively as "writing implements 102" and any one may be referred to generically as a "writing implement 102."

Figure 1:
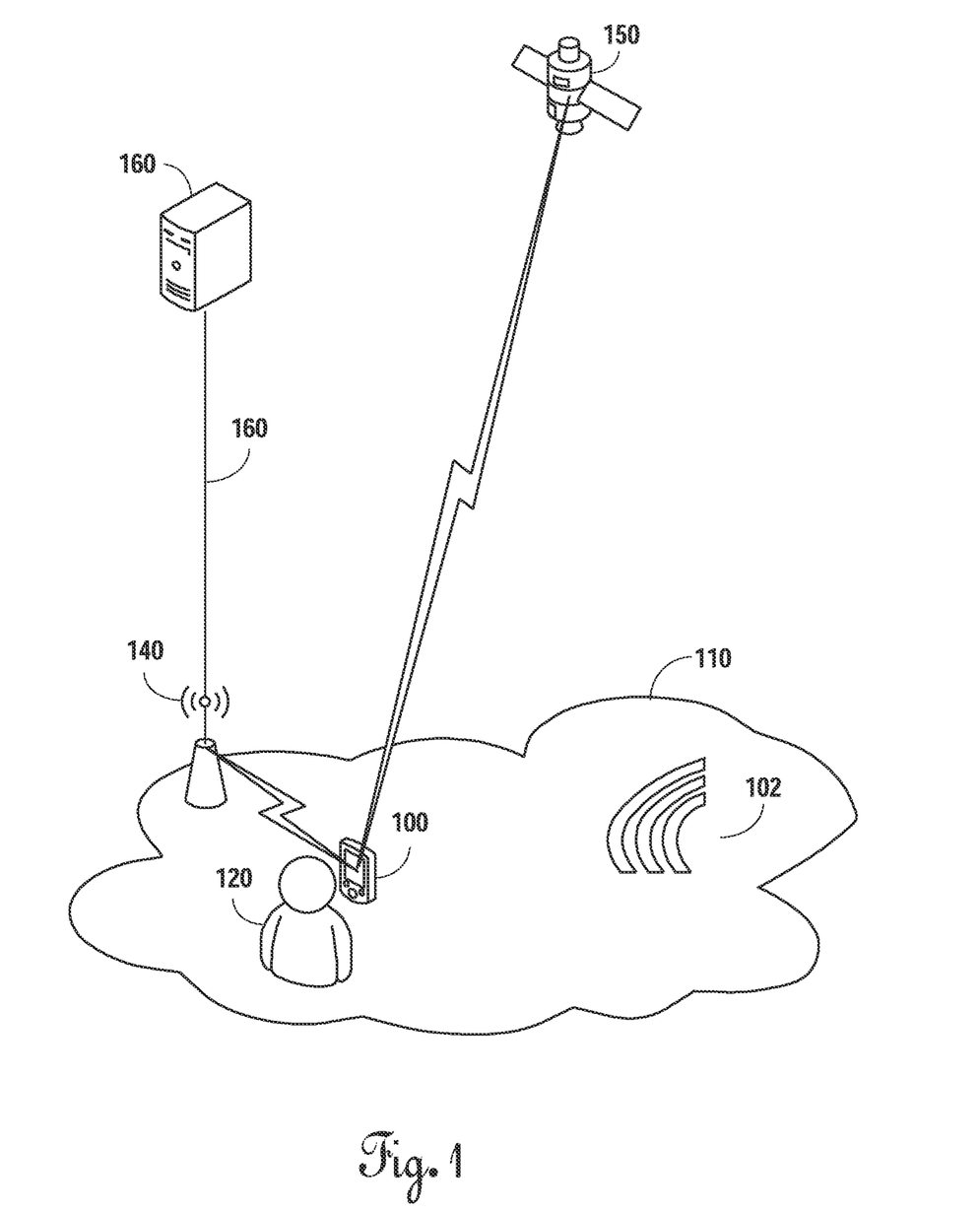
FIG. 1 is a network-level diagram of a golf ball locator system.

FIG. 1 discloses a block diagram of an exemplary embodiment of a golf ball locator system. In this embodiment, user 120 operates a ball finder 100, which is a handheld device in the embodiment shown. Ball finder 100 interfaces wirelessly with a wireless access point (WAP) 140. WAP 140 provides a broadband internet connection 160 to a geographic information service (GIS) server 170. GIS server 170 is disclosed as a generic example of a service providing map data corresponding to global coordinates, and need not be a "true" GIS server. For example, a service such as Mapquest or Google Earth could provide usable information, or a private database of golf course maps could also be used. In the disclosed embodiment, WAP 140 is shown by way of example only, as any communication device providing wireless networking capabilities would be suitable. For example, in some embodiments, ball finder 100 could be configured to interface with a cellular or 3G network. User 120 is golfing on golf course 110. Before beginning his golf game, user 120 may have prepared a Radio Frequency Identification RFID tagged golf ball 102. RFID golf ball 102 may be prepared according to the methods described herein. Ball finder 100 may also be configured to communicate with a GPS satellite 180, and thereby receive absolute position information.

Figure 2:
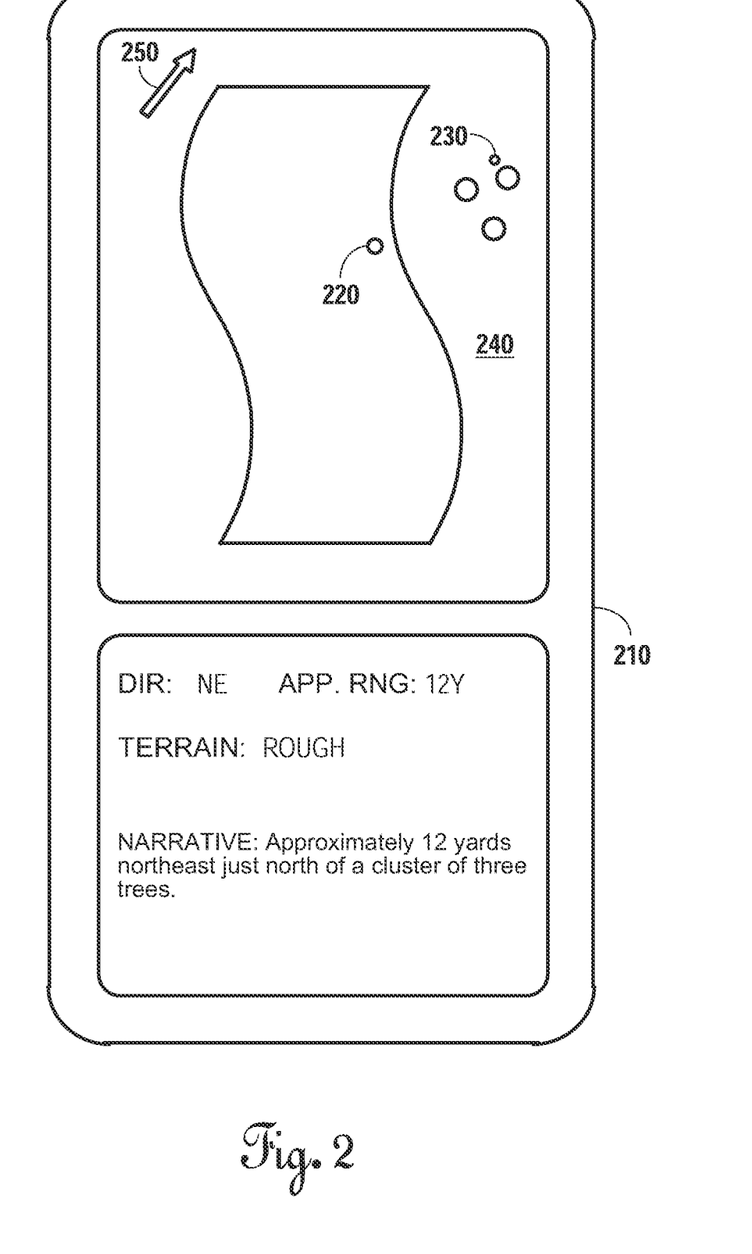
FIG. 2 is a front view of an exemplary ball locator.

FIG. 2 is a front view of an exemplary embodiment of a ball finder 100. Ball finder 100 may be a standalone device, or may be a handheld device such as a personal digital assistant (PDA), mobile phone, handheld computer, or other small computing device running a specialized application. In the embodiment shown, the display 210 is divided into two sections. The upper section includes an overlaid map 240, which may include a high-resolution map of the golf course 110, and may have known features such as zoom and pan. The overlaid map 240 includes an icon indicating the user location 220. If the golf ball 102 becomes lost on the course, user 120 can reference ball finder 100. Ball finder 100 will indicate ball location 230, including nearby terrain features. Ball finder 100 may also include other indicators, such as a directional arrow 250 pointing in the compass direction of the lost ball 230. The lower section of display 210 may include other useful information, as shown, such as the direction, approximate range, terrain, and a narrative description of the location of the ball.

Figure 3:
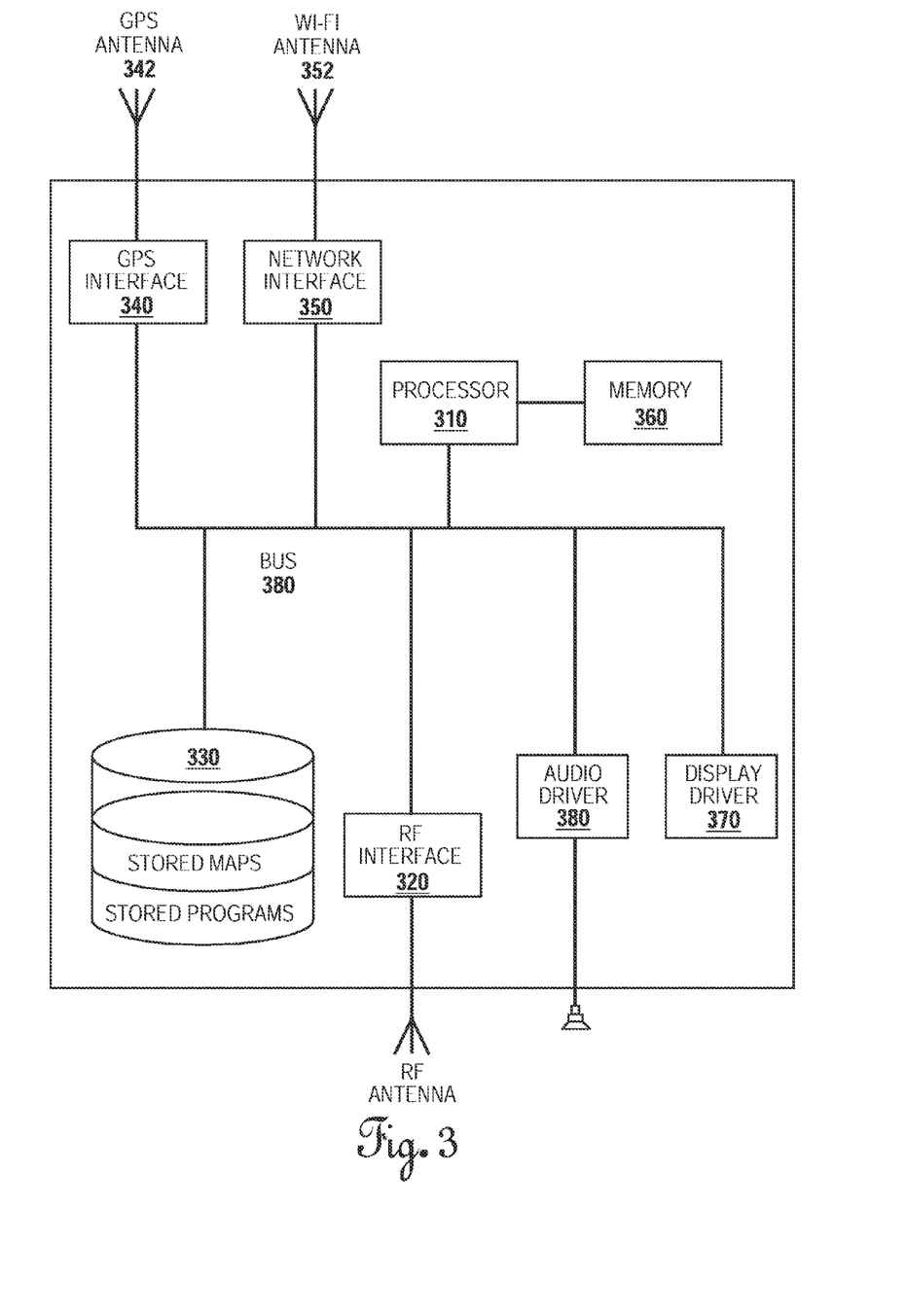
FIG. 3 is a block diagram of a ball locator.

FIG. 3 is a block diagram of an exemplary embodiment of a ball finder 100. Ball finder 100 is controlled by a processor 310, which may be a microprocessor or other similar computing device. Processor 310 is communicatively coupled to a memory 360, which in an exemplary embodiment is a low-latency volatile random access memory (RAM), but which may be any suitable medium for storing and receiving computer-readable information. Processor 310 is communicatively coupled to other parts of the system via a bus 380. A display driver 370 is provided to drive display 210. A radio frequency interface 320 is provided to control an RF antenna 322, thereby forming an RF transceiver. A network interface 350 is also provided, and is connected to a wi-fi antenna 352. This enables ball finder 100 to connect to a wireless network if available. The wireless network may be an 802.11-style wireless local area network, a cellular network, or any other wireless network capable of providing network services. A GPS interface 340 connects to a GPS antenna 342, and allows ball locator 100 to receive GPS data from a GPS satellite 180, thereby determining position of ball finder 100.

A storage 330 may be a hard disk, flash drive, or other non-volatile storage medium suitable for permanent storage of information, such as stored maps and stored programs.

RF interface 320 is configured to communicate with a prepared ball 102 so that ball finder 100 can determine the position of prepared ball 102 relative to itself. With a relative position, ball locator can provide basic information such as range and direction. In embodiments with additional features, such as GPS, a network interface, and maps, more detailed information can be provided. For example, a high-quality map of the golf course may be stored in storage 330. The map may be received, for example, from satellite survey data, such as data found in Google Earth, or from other GIS services. In some cases, golf courses may provide Wi-Fi network services as a value-added extra, and may provide suitable maps over the network. Alternatively, a manufacturer of ball locator 100 may store a database of golf course maps in memory 330, or may have a central database of golf course maps, which can be retrieved over a wireless network via network interface 350. For example, ball finder 100 may receive GPS coordinates from GPS satellite 180, and may then user WAP 140 to connect to a broadband internet connection 160 and contact GIS server 170. GIS server 170 may provide a suitable local map, including terrain information. Ball locator 100 may then display the balls location relative to the user, and provide information about landmarks and surrounding terrain, including in some cases a narrative description of the location of the ball and the surrounding terrain.

In use, a golf ball is prepared with an RFID marking. For example, U.S. Pat. No. 7,068,170, which is incorporated herein by reference in its entirety, discloses a medium with embedded RFID chips that can be used to mark a surface. An RFID paint can be prepared according to a preferred embodiment of the '170 patent with RFID chips approximately 0.25 square millimeters. Very small RFID chips are desirable so that there is minimal interference with the aerodynamic and flight characteristics of the ball. It is anticipated that with improvement in technology, even smaller RFID chips will become available, and the present disclosure is intended to cover such technological improvements.

Very small RFID chips can be suspended in an ink or paint, and then provided in an applicator such as an RFID ink pen or marker. A user could run the RFID pen or marker along the surface of the ball, thereby leaving a plurality of RFID chips, which are held to the surface by the ink or paint.

Figure 4:
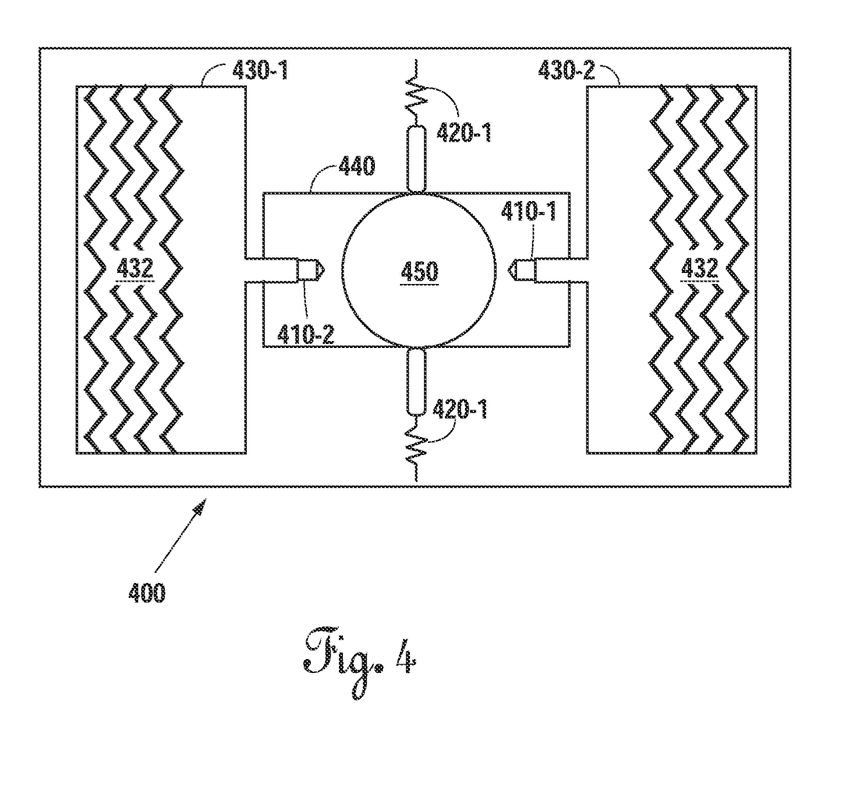
FIG. 4 is a cutaway side view of an exemplary embodiment of a device for applying a paint coating to a golf ball.

FIG. 4 is a cutaway front view of one embodiment of a ball coater 400, used to prepare a stock ball 450 for use with an RFID locator. In this embodiment, user 120 can place a stock ball 450 into a ball chamber 440, which is sized to hold one or more stock balls. Spring-loaded pins 420 or other similar securing mechanism can be used to secure stock ball 450 in ball chamber 440. A cover (not shown) may also be provided to enclose ball chamber 440 after stock ball 450 has been placed therein. Ball coater 400 may also be provided with one or more RFID paint chambers 430 containing RFID paint 432. Paint nozzles 410 may fluidly couple to RFID paint reservoir 430, and be configured to forcibly spray or mist RFID paint 432 over stock ball 450.

Other possibilities for preparing a golf ball include devices and methods that embed an RFID chip just beneath the surface of the golf ball. For example, the applicator may be provided with a small syringe that slightly pierces the ball to embed a small RFID chip just below the surface, and then optionally applies a dab of paint to help seal the incision and smooth the surface of the ball. Other similar solutions could include a sharp blade that makes a small incision in the golf ball so that an RFID chip can be implanted, or a spiked roller that can be rolled across the surface of the golf ball, making small depressions in the surface and painting an RFID chip into each impression.

A concern with the foregoing preparations is that the small RFID chips may be very fragile, and because they are near the surface of the ball, it's likely that a strike from a golf club will destroy the chip, thus defeating the function of the RFID golf ball. A solution is to apply a plurality of RFID chips regularly across a large portion of the surface. The RFID chips may be identical and fungible, so that the destruction of one or more chips by impact will not defeat the RFID function. For example, a syringe or blade, as described above, could be used to implant multiple RFID chips, spread over the whole ball. Another method may include selecting a first circumference, and a second circumference orthogonal to the first circumference. An RFID chip may be inserted at a first point at the intersection of the two circumferences, and then at several more points, such as 90, 180, and 270 degrees from the first point. On the second circumference, chips may be inserted at the 90 and 270 degree points, so that there is a substantially uniform distribution of chips across the ball. Similarly, a pen, marker, or spiked roller could be used to outline two or more orthogonal circumferences of the ball, so that RFID chips are regularly dispersed over the ball, ensuring that one or more chips are located in the area suffering the least shock.

Another consideration is the thickness of the ink or RFID protrusions from the ball and/or depth of incisions made into the ball. Such disturbances may somewhat affect the flight characteristics of the ball, so that it may not be suitable for professional or formal play. But those concerns will be less marked for training or for beginning players, who have less control over the ball anyway, and thus who are more likely to lose balls than professional or experienced players. The proposed solution provides a compromise solution, so that an inexperienced player can easily mark a plurality of off-the-shelf golf balls instead of buying more expensive balls with embedded tracking technology.

The present disclosure further provides advantages with respect to orientation. While a single RFID chip on a ball may end up damaged, or in an orientation that is unsuitable for detection, the present disclosure provides a method whereby a plurality of suitable RFID chips can be used to mark the ball, so that if one chip is damaged or is oriented in an unfavorable position, other chips may still be able to provide operative information.

FIGS. 5A-5F discloses exemplary golf balls for use in an alternative embodiment of a golf ball locator. In the alternative embodiment, RF interface 320 (FIG. 3) may instead be a narrow-beam directional radar or microwave beam, operating, for example, in the X-band range (8-12 GHz). Because microwave signals will reflect off of many surfaces found on a golf course, including rocks, trees, water, and wet grass, golf balls will need to be specially prepared to provide a characteristic radar signature. This specification speaks in terms of "paint" applied to a prepared ball, and the term "paint" is intended to include any coating configured to coat a golf ball. Processor 310 (FIG. 3) may then be programmed to receive reflected signals, and compare a reflection profile to a stored characteristic radar signature for the golf ball. For example, fully reflective ball 510 may be coated completely in a highly-reflective paint 514, which will provide excellent reflection. For purposes of this specification, a paint is considered highly reflective if it is substantially more reflective than an ordinary enamel golf ball coating. Highly-reflective paint 514 may be a metallic paint, or could be based on other highly-reflective material such as the 3M "Scotchlite" line. Locating the ball may then consist of user 120 sweeping ball finder 100 in a wide, slow arc near a location where the ball is believed to be. Ball finder 100 will compare radar returns to the stored radar signature and indicate that the ball is found when a return signal matching the radar signature is found.

Figure 5A:
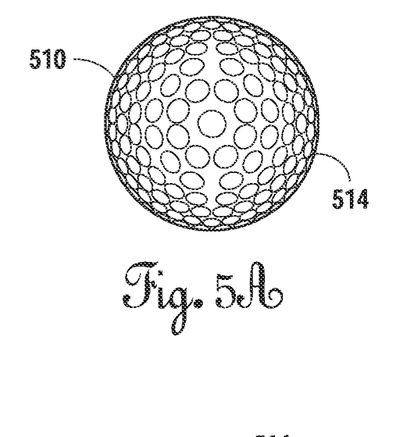
FIGS. 5A-5F are front views of a plurality of balls prepared with a characteristic radar signature.
Figure 5B:
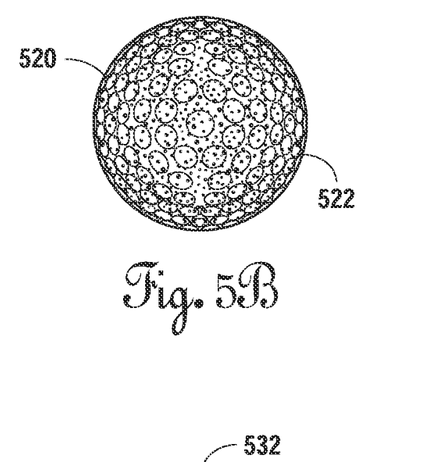
Figure 5C:
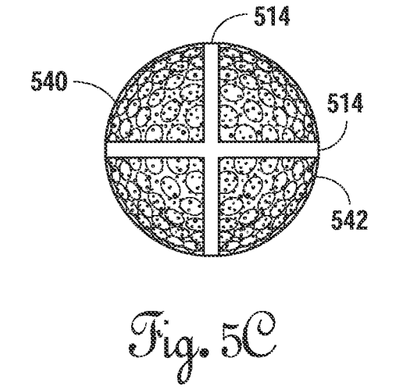
Figure 5D:
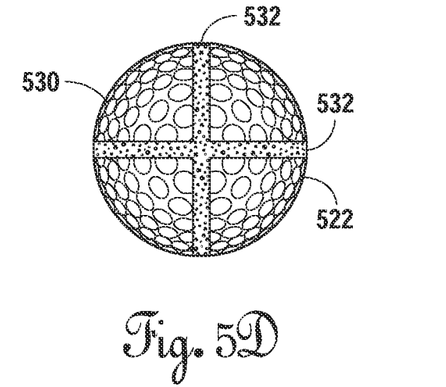
Figure 5E:
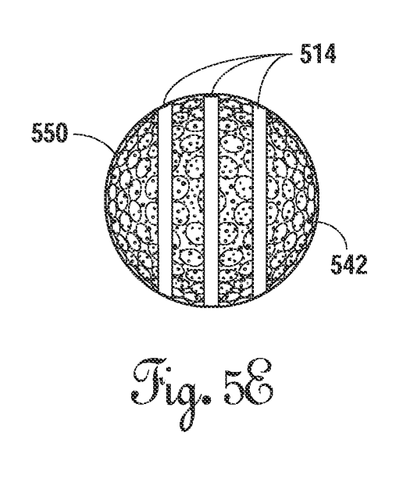

Alternatively, rather than painting the entire ball with a highly-reflective paint 514, patterns may be applied to the ball. The balls radar signature will then include a bifurcated signature. One part of the ball will have a first radar reflectivity, and the second part will have a second reflectivity. For example, reflective crosshairs ball 540 is an example of a crosshairs configuration, and reflective pattern ball 550 is an example of A possible striped pattern. These patterns may be enhanced by further including transverse lines. For example, crosshairs ball 540 may also include a transverse stripe of highly-reflective paint 540 around the visible circumference of the ball and perpendicular to the visible lines. Ball finder 100 may thus be able to locate the ball from a variety of different orientations by receiving a radar cross signature characteristic of the orientation.

As an alternative to providing a highly-reflective paint for providing a characteristic radar signature, a highly radar absorbent paint 522 may be used to create the signature. For example, U.S. Pat. No. 5,952,953 to Nikawa, et al., and entitled "Wave Absorber," discloses a highly radar-absorbent black iron ball paint. For purposes of this specification, a highly-absorbent paint is considered to be a paint that has a substantially lower reflectivity than an ordinary enamel golf ball coating. This type of paint may be used, for example, to paint stealth aircraft that are designed to avoid radar detection. Black iron ball paint has a characteristic very low radar reflectivity. When ball finder 100 is searching for fully absorbent ball 520, which is covered completely in absorbent paint 522 it will be able to recognize a spot that is less radar reflective than even the ground or vegetation surrounding it. Ball finder 100 may thus identify the radar "dead spot" in the characteristic shape and size of a golf ball as fully absorbent ball 520.

Figure 5F:
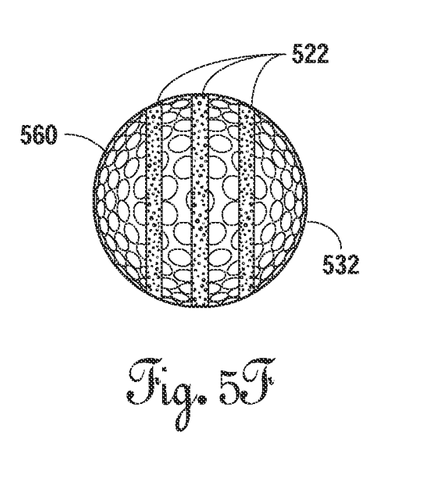

In an alternative embodiment, absorbent paint 522 may be applied to the ball in a cross hair pattern as in 530 or a different pattern such as a striped pattern as in 560. Underlying absorbent paint 522 is a layer of base paint 532. Base paint 532 may be a paint, such as white paint, which will be significantly more reflective than absorbent paint 522. Thus, ball finder 100 may be able to identify a characteristic pattern including a relatively highly-reflective base paint 522, with an overlying pattern of absorbent paint 532. Alternatively, base paint 532 may be a highly visually conspicuous color, such as a fluorescent, to help user 120 visually identify the ball, or may be a reflective paint 514. A reflective paint 514 may help in visual identification, as well as provide further contrast between the base paint 532 and absorbent paint 522. A stronger contrast will help in providing a strong characteristic signature.

The balls of FIG. 5 may be factory manufactured and be sold specifically for use with ball finder 100. Alternatively, any of the paints disclosed may be sold in a user-applicable medium such as a paint pen, and user 120 may apply a paint pattern to the ball. Furthermore, the ball coater 400 of FIG. 4 may be provided with either a reflective paint or absorbent paint instead of an RFID paint. In the case of a user application, ball finder 100 may be trained. A characteristic training method comprises placing ball finder 100 into a "training mode," and then "scanning" prepared ball 102 from numerous angles. Ball finder 100 may then store a characteristic radar signature of prepared ball 102, which it may compare to returned radar signals for identifying the location of ball 102.

The application of specialized paint will provide a prepared golf ball 102 with a radar signature substantially different from the radar signature of an ordinary golf ball. Ordinary golf balls will generally have an enamel coating that is most commonly white, but also may be matte colored, or fluorescent for easy visual identification. Ordinary golf balls will have a characteristic radar reflectivity that will be lower for darker matte colored balls, and higher for brighter fluorescent balls, with common white enamel balls also falling in the reflectivity spectrum. The fully absorbent ball of the present disclosure will have a radar signature that is substantially weaker than these prior art balls, and fully reflective balls will have a radar signature substantially stronger than these prior art balls. Furthermore, prior art balls generally have a single, uniform characteristic reflectivity and radar signature, whereas the patterned balls herein described will have a two-tone differential radar signature. With a patterned ball, ball finder 100 may be enabled to better avoid false positives by matching only radar signatures corresponding to the specific two-tone pattern rather than zones or objects that coincidentally have similar reflectivity to the ball's paint Although the present disclosure is drawn to one or more exemplary embodiments, the embodiments disclosed are not intended to limit the scope of the claims. On the contrary, it is intended that the claims attached hereto be interpreted in the broadest reasonable manner.

What is claimed is:

1. A locator for locating a golf ball, the locator comprising:
    a radar;
    a display;
    a processor communicatively coupled to and configured to control the radar and the display; and
    a memory communicatively coupled to the processor and having stored therein software instructions that when executed instruct the processor to:
        cause the radar to send a radar pulse;
        receive a radar return signal;
        compare the radar return signal to a stored bifurcated radar signature characteristic of the golf ball, wherein the stored bifurcated radar signature comprises a first portion having a first radar reflectivity and a second portion having a second radar reflectivity, the first radar reflectivity contrasting substantially with the second radar reflectivity, and the stored bifurcated radar signature substantially distinguishes the golf ball from at least one other object;
        calculate a position of the ball relative to the locator; and
        display information concerning the position of the ball, including a narrative description of the position of the ball.

2. The locator of claim 1 further comprising:
    a global positioning system receiver; and
    a network interface configured to receive geographic information system data;
    wherein the processor is further configured to:
        receive a global position for the locator from the global positioning system receiver;
        calculate a global position of the ball based on the global position of the locator and the position of the ball relative to the locator;

receive map data from the network interface; and
draw a map indicating the positions of the locator and the ball.

3. The locator of claim 2, wherein the software instructions further instruct the processor to include nearby terrain features on the map.

4. The locator of claim 1, wherein the software instructions further instruct the processor to display a range to the ball relative to the locator.

5. The locator of claim 1, wherein the software instructions further instruct the processor to display a direction to the ball relative to the locator.

6. The locator of claim 1, wherein the pattern comprises transverse lines disposed to make a golf ball more easily locatable from a plurality of different angles.

7. A computer-executable method of locating a golf ball comprising:
sending a radar pulse via a radar transceiver;
receiving a radar return signal via the radar transceiver;
constructing from the radar return signal a constructed radar signature for the golf ball;
retrieving from a memory a stored characteristic radar signature of the golf ball, wherein the stored characteristic signature comprises a first portion having a first radar reflectivity and a second portion having a second radar reflectivity, the first radar reflectivity contrasting substantially with the second radar reflectivity, and the two radar reflectivities together providing a radar signature that substantially differentiates the golf ball from at least one other object;
comparing the constructed radar signature to the stored characteristic radar signature to determine that they are substantially similar;
calculating a position of the ball; and
providing via a user interface a human-perceptible indication of a position of the ball, including a narrative description of the position of the ball.

8. The computer-executable method of claim 7, further comprising:
receiving a first global position from a global positioning system;
calculating a global position of the golf ball;
receiving map data; and
drawing a map indicating the positions of the ball relative to the first global position.

9. The computer-executable method of claim 8, further comprising describing nearby terrain features on the map.

10. The computer-executable method of claim 7, further comprising displaying a range and direction to the ball.

11. The computer-executable method of claim 7, wherein the pattern comprises transverse lines disposed to make a golf ball more easily locatable from a plurality of different angles.

12. A tangible non-transitory computer-readable medium having stored thereon instructions operable to instruct a golf ball locator to:
send a radar pulse via a radar transceiver;
receive a radar return signal via the radar transceiver;
retrieve from a memory a stored characteristic radar signature of the golf ball, wherein the stored characteristic signature comprises a first portion having a first radar reflectivity and a second portion having a second radar reflectivity, the first radar reflectivity contrasting substantially with the second radar reflectivity, and the two radar reflectivities together provide a radar signature that substantially differentiates the golf ball from at least one other object;
compare the constructed radar signature to the stored characteristic radar signature to determine that they are substantially similar;
calculate a position of the ball; and
provide via a user interface a human-perceptible indication of a position of the ball, including a narrative description of the position of the ball.

13. The tangible non-transitory computer-readable medium of claim 12, wherein the instructions are further operable to:
receive a first global position from a global positioning system;
calculate a global position of the golf ball;
receive map data; and
draw a map indicating the positions of the ball relative to the first global position.

14. The tangible non-transitory computer-readable medium of claim 13, wherein the instructions are further operable to describe nearby terrain features on the map.

15. The tangible non-transitory computer-readable medium of claim 12, wherein the instructions are further operable to display a range and direction to the ball.

16. The tangible non-transitory computer-readable medium of claim 12, wherein the pattern comprises transverse lines disposed to make a golf ball more easily locatable from a plurality of different angles.

* * * * *